United States Patent [19]

Ogawa

[11] Patent Number: 5,227,686
[45] Date of Patent: Jul. 13, 1993

[54] SPINDLE MOTOR

[75] Inventor: Tokumon Ogawa, Komagane, Japan

[73] Assignee: Nagano Nidec Corporation, Nagano, Japan

[21] Appl. No.: 847,163

[22] Filed: Mar. 5, 1992

[30] Foreign Application Priority Data

Apr. 12, 1991 [JP] Japan .................................. 3-108695
Apr. 13, 1991 [JP] Japan .................................. 3-108723

[51] Int. Cl.$^5$ ........................ H02K 5/16; G11B 17/02
[52] U.S. Cl. ........................ 310/90; 310/42; 360/99.08
[58] Field of Search ............ 310/90, 89, 67 R, 42, 310/91; 360/99.08, 99.12

[56] References Cited

U.S. PATENT DOCUMENTS

| | | | |
|---|---|---|---|
| 4,717,977 | 1/1988 | Brown | 360/98 |
| 4,905,110 | 2/1990 | Krum et al. | 360/99.08 |
| 4,928,029 | 5/1990 | Wright | 310/89 |
| 5,061,868 | 10/1991 | Iwazaki et al. | 310/67 R |

FOREIGN PATENT DOCUMENTS 60-139140 7/1985 Japan .................................. 360/98

*Primary Examiner*—Steven L. Stephan
*Assistant Examiner*—Matthew Nguyen
*Attorney, Agent, or Firm*—McCormick, Paulding & Huber

[57] ABSTRACT

A spindle motor includes a shaft, a hub assembly unit rotatable relative to the shaft, an upper bearing structure and a lower bearing structure both interposed between the shaft and the hub assembly unit, and a stator disposed between the upper and lower bearing structures. The stator, the hub assembly unit, and the upper and lower bearing structures are attached to a specific side of the shaft. The hub assembly unit has an aluminum-made hub and an iron-made yoke, both of which are joined together through a pair of fixing portions. One fixing portion has a relatively strong fitting force, whereas the other fixing portion has a relatively weak fitting force.

11 Claims, 7 Drawing Sheets

SPINDLE MOTOR

FIELD OF THE INVENTION

The present invention relates to a spindle motor for driving a recording disk such as a magnetic disk.

DESCRIPTION OF THE PRIOR ART

In general, spindle motors include shaft members, hubs rotatable relative to the shaft members, pairs of bearing members interposed between the shaft members and the hubs, rotor magnets attached to the hubs through yokes, and stators attached to the shaft members to face the rotor magnets. Components, such as hubs, stators and pairs of bearing members, are mounted from both sides of the longitudinal axes of the shaft members.

However, spindle motors in which the components such as hubs are mounted from both sides of the longitudinal axes, are not suitable for automatic assembly. Automatic assembly machines become complicated and expensive.

Also, in such a spindle motor, the hub is formed of aluminum or aluminum alloy, whereas the yoke is formed of iron, both of which substances have different coefficients of thermal expansion. Therefore, when the area where both the components are joined together is relatively wide, they are reliably secured to each other. However, when the ambient temperature varies significantly, heat distortion may occur in the hub and yoke. When the above area is relatively small, although heat distortion can be suppressed, it is difficult to coaxially secure both components with accuracy.

SUMMARY OF THE INVENTION

A first object of the present invention is to provide a spindle motor which is relatively easy to automatically assemble and is capable of reducing manufacturing cost.

A second object of this invention is to provide a spindle motor in which a hub and a yoke can be coaxially secured with accuracy, and which is capable of suppressing eccentricity caused by a temperature change.

Other objects and features of this invention will be readily appreciated from the below description.

DETAILED DESCRIPTION OF THE PREFERRED EMBODIMENTS

The present invention will be described below with reference to the accompanying drawings.

First Embodiment

The first embodiment of a spindle motor according to this invention will be described with reference to FIGS. 1 through 6.

Figure 1:
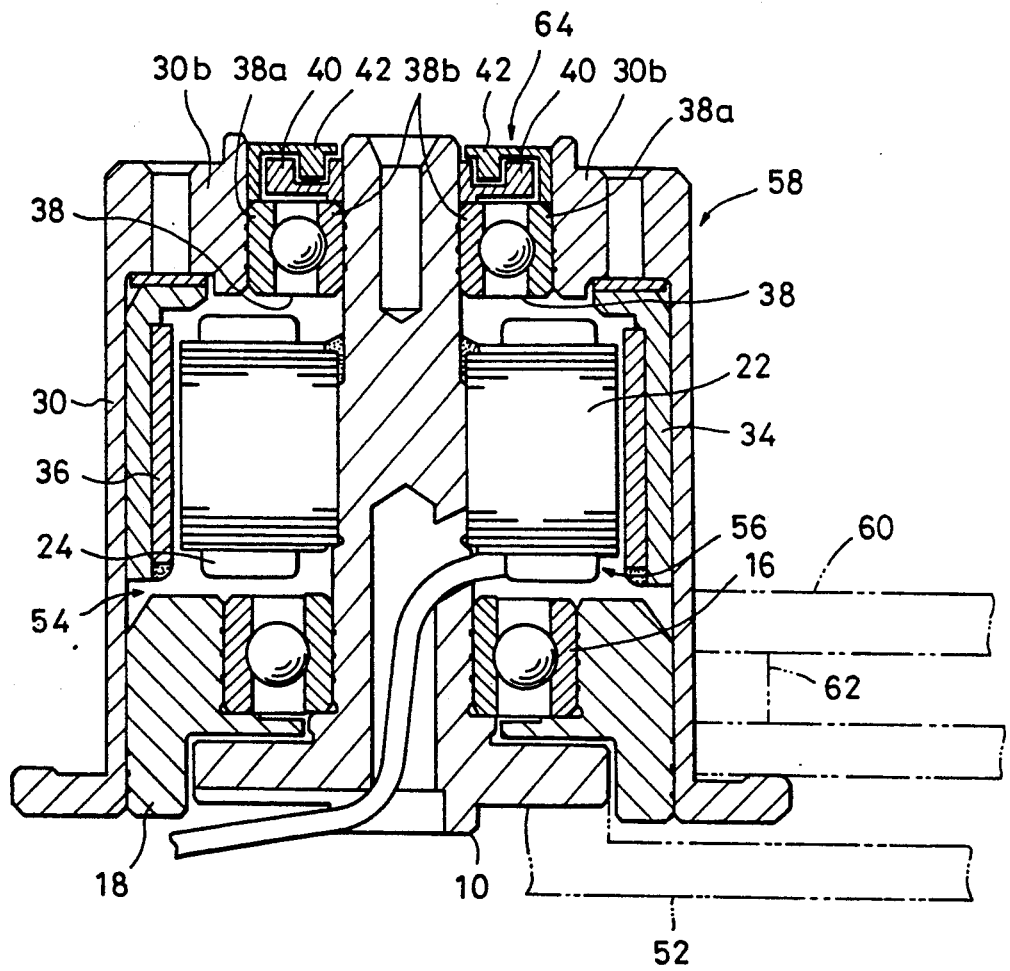
FIG. 1 is a sectional view of a spindle motor according to a first embodiment of the present invention.

The spindle motor shown in FIG. 1 comprises a shaft 10 and a hub 30 rotatable relative to the shaft 10. A pair of bearing members (upper and lower bearing members) 38 and 16 are interposed between the shaft 10 and the hub 30. A yoke 34 is attached to the inner periphery of the hub 30, and an annular rotor magnet 36 is attached to the inner periphery of the yoke 34.

The structures of various components of the spindle motor and a method of assembling the motor will be described with reference to FIGS. 2 through 6.

Figure 2:
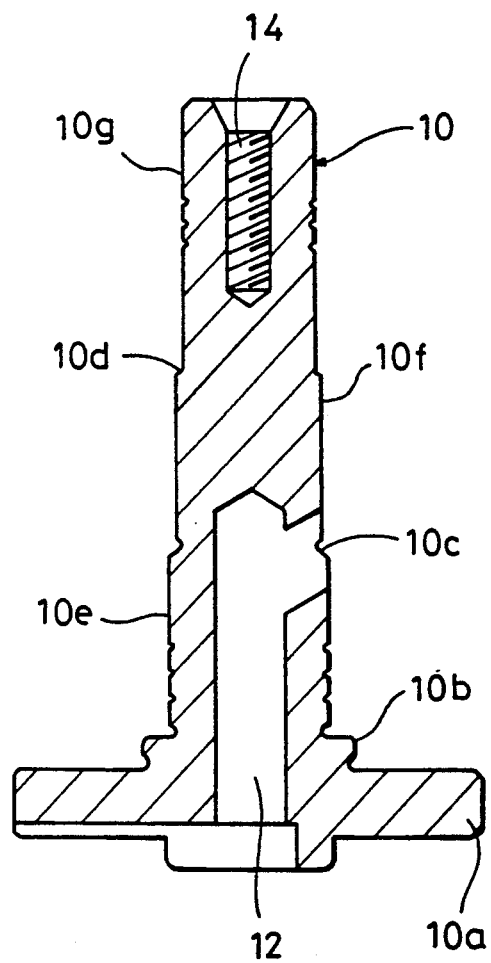
FIGS. 2 through 6 are sectional views each illustrating an assembling process for the spindle motor shown in FIG. 1.

As shown in FIGS. 1 and 2, an annular bracket 10a is formed at the lower end of the shaft 10 to project radially, and is mounted on a frame 52 of a driving device for rotatively operating a recording disk. The shaft 10 has a large-diameter portion 10e, a medium-diameter portion 10f and a small-diameter portion 10g. The large-diameter portion 10e of a relatively large diameter is formed at one (lower) end of the shaft 10, whereas the small-diameter portion 10g of a relatively small diameter is formed at the other (upper) end of the shaft 10. The medium-diameter portion 10f has a diameter intermediate between the large-diameter portion 10e and the small-diameter portion 10g, and is formed therebetween. A shoulder 10b, serving as a first contact portion, is formed at one (lower) end of the large-diameter portion 10e; a shoulder 10c, serving as a second contact portion, is formed at one (lower) end of the medium-diameter portion 10f; and a shoulder 10d is formed at one (lower) end of the small-diameter portion 10g. The large-diameter portion 10e starts at the shoulder 10c, and the medium-diameter portion 10f starts at the shoulder 10d. A communicating hole 12 is bored in the shoulder 10c, extends in the axial direction of the shaft 10, and opens at the lower end of the shaft 10. A female threaded hole 14 is formed at the upper end of the shaft 10.

Figure 3:
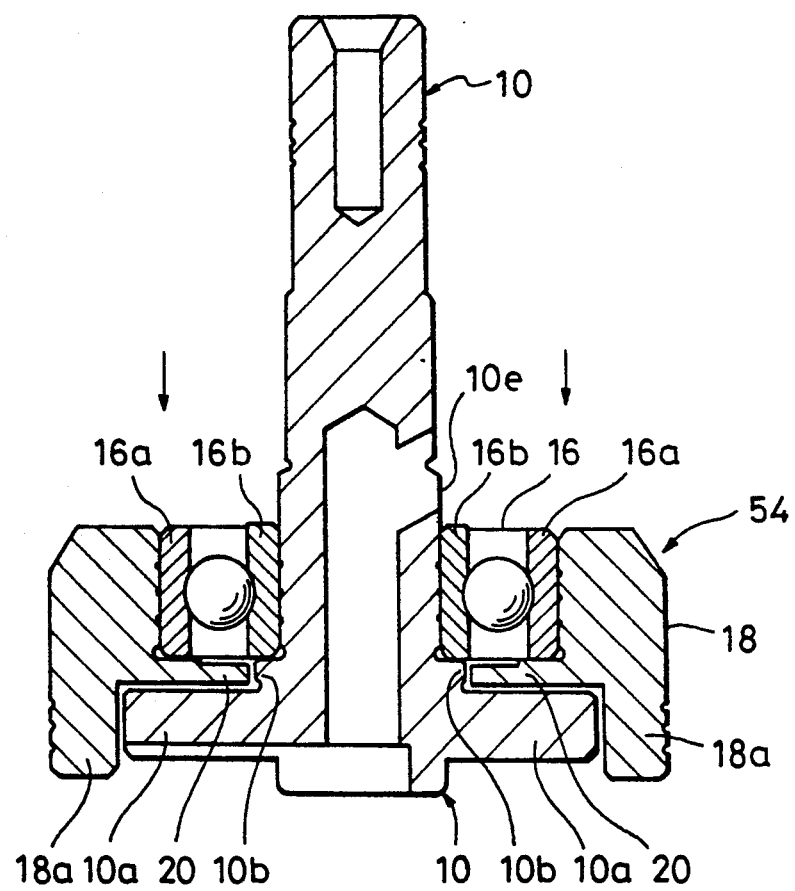

As shown in FIGS. 1 and 3, in this embodiment an annular member 18 is attached to the outer surface of the lower bearing member 16. The lower bearing member 16 and the annular member 18 constitute a lower bearing structure 54. An annular projection 20 is formed substantially at the center of the height of the annular member 18 so as to radially extend from the inner periphery of the annular member 18. The lower bearing structure 54 is formed in such a manner that an outer ring 16a of the bearing member 16 is bonded and secured to the obverse surface of the projection 20 of the annular member 18. The lower bearing structure 54 is mated with the shaft 10 from above as indicated by the arrows shown in FIG. 3. The reverse surface of an inner ring 16b of the bearing member 16 comes into contact with the obverse surface of the shoulder 10b of the shaft 10, whereby the lower bearing structure 54 is positioned. Thus, the lower bearing member 16 comes into contact with the large-diameter portion 10e, and the inner ring 16b of the bearing member 16 is bonded and secured to the large-diameter portion 10e. Labyrinth seal means is composed of the projection 20 and a peripheral wall 18a of the annular member 18, and the bracket or flange 10a and the shoulder 10b of the shaft 10.

Figure 4:
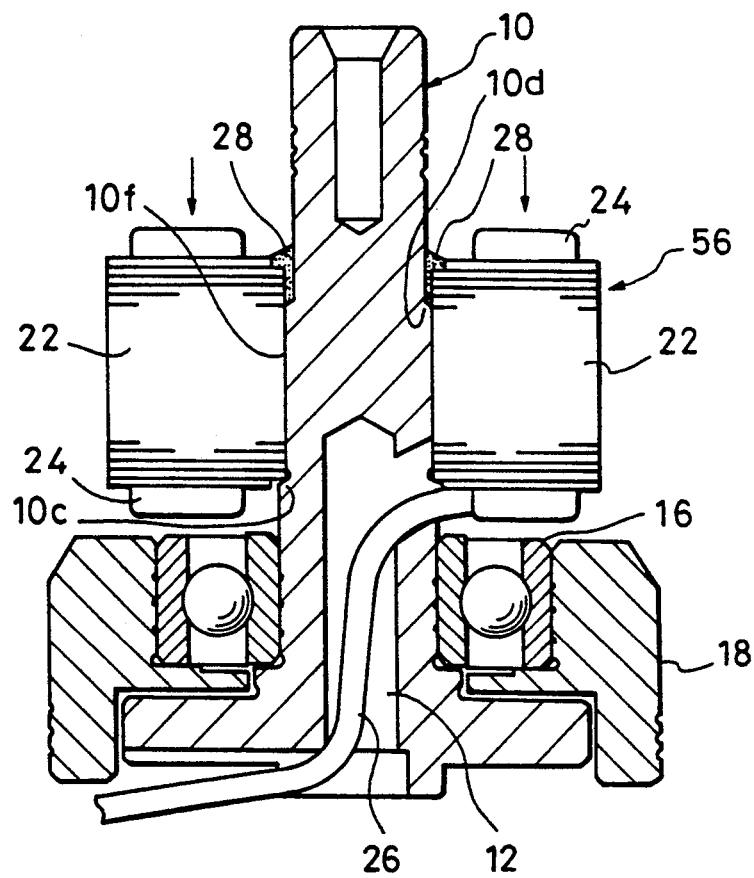

As shown in FIGS. 1 and 4, a stator 56 is attached to the shaft 10 so as to face the rotor magnet 36. The stator 56 has a stator core 22 and a coil 24 wound around the stator core 22. It is mated with and mounted on the shaft 10 from above while a lead wire 26 is passed through the communicating hole 12. The lower, inner peripheral edge of the stator core 22 comes into contact with the shoulder 10c, which is the second contact portion, whereby the stator 56 is positioned, and the stator core 22 is attached to the medium-diameter portion 10f. The space between the upper, inner peripheral edge of the stator core 22 and a portion near the shoulder 10d is filled with an adhesive. The lead wire 26 passes through the communicating hole 12, and is drawn out of the lower end of the shaft 10.

Figure 5:
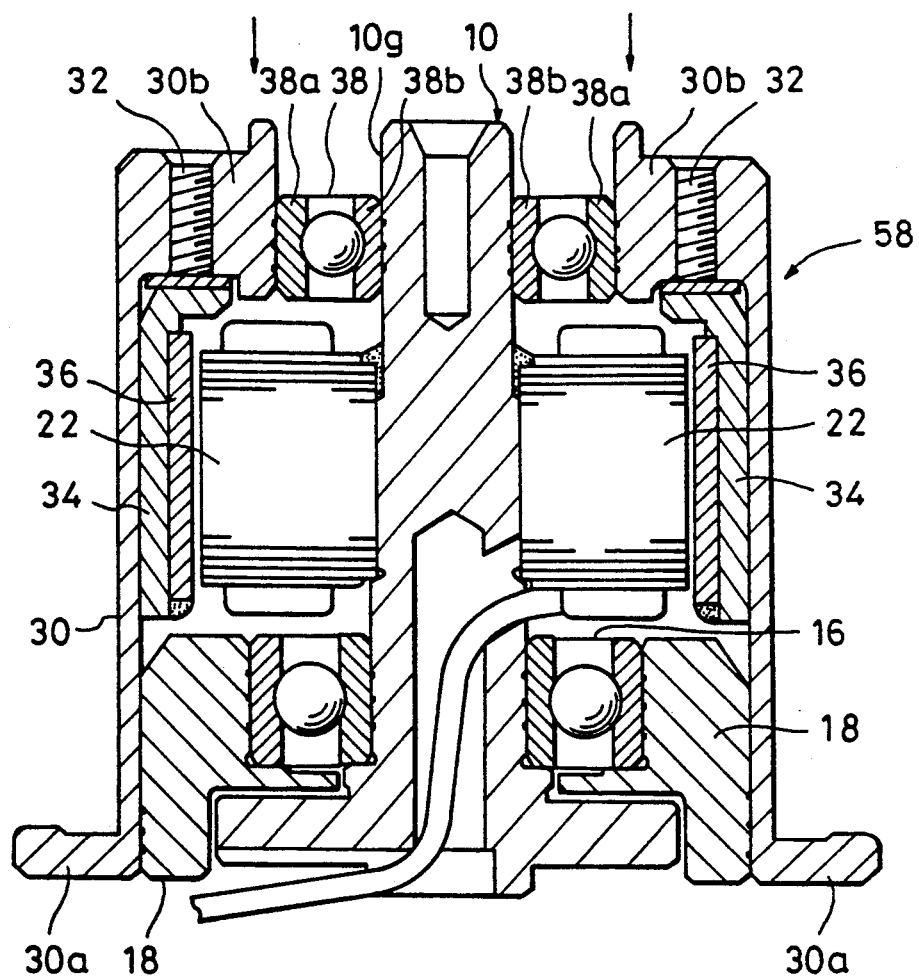

As illustrated in FIGS. 1 and 5, the substantially cylindrical rotor hub 30, the yoke 34 and the rotor magnet 36 constitute a hub assembly unit 58. A recording disk 60, like a magnetic disk, is attached to the hub 30 with the aid of an annular spacer 62. The hub 30 has at the lower end thereof a flange 30a for supporting the recording disk 60. Threaded holes 32 are bored in an edge wall 30b of the hub 30 so as to attach a clamp (not shown) which fixes the recording disk 60. The rotor magnet 36 is secured to the inner periphery of the rotor hub 30 through the yoke 34.

In this embodiment, the upper bearing member 38 forms an upper bearing assembly structure which, together with the hub assembly unit 58, constitutes a unit assembly. The unit assembly is constructed in such a way that the upper bearing member 38 is secured by an adhesive to the hub assembly unit 58. The upper bearing member 38 is mated with the shaft 10 from above, thereby positioning the unit assembly as shown in FIG. 5. Thus, the upper bearing member 38 comes into contact with the small-diameter portion 10g. The inner periphery of an inner ring 38b of the upper bearing member 38 is secured by the adhesive to the outer periphery of the shaft 10. The lower, inner periphery of the hub 30 is secured by the adhesive to the outer periphery of the annular member 18.

Figure 6:
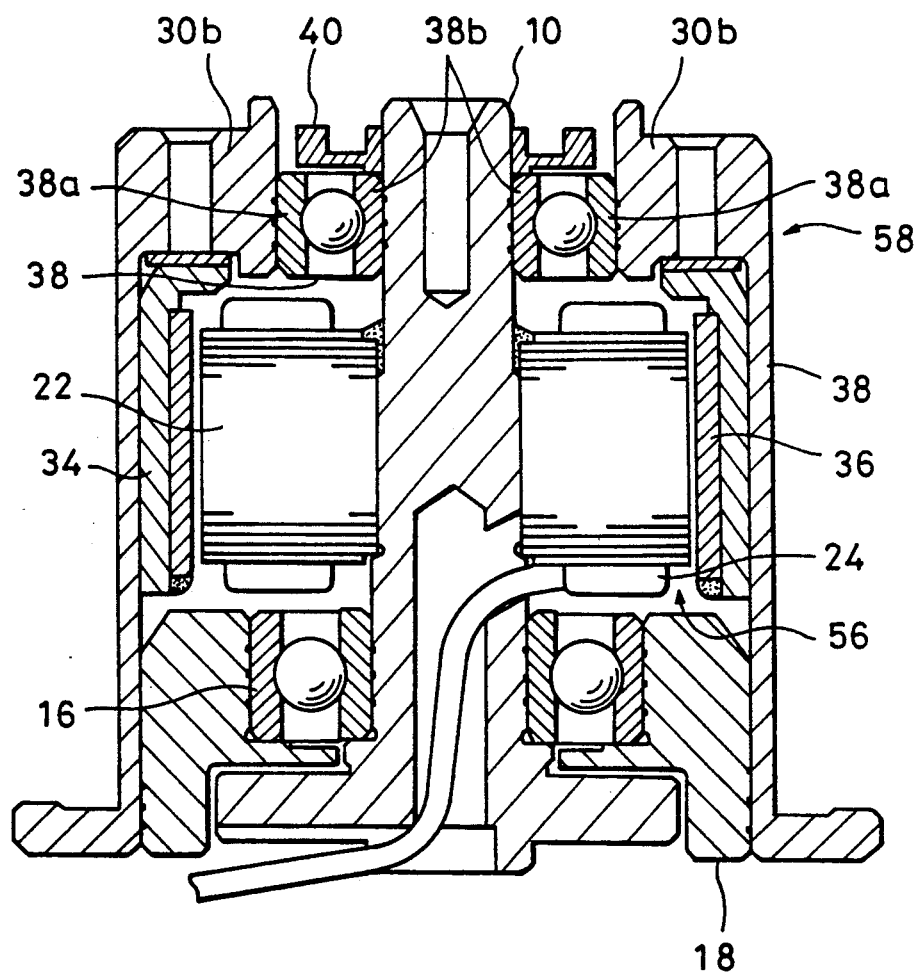

As illustrated in FIGS. 1 and 6, labyrinth seal means composed of an upper member 42 and a lower member 40 is disposed on the upper bearing member 38. The lower member 40 is mated from above with the upper bearing member 38 shown in FIG. 5. The lower, inner periphery of the lower member 40 comes into contact with the obverse surface of the inner ring 38b of the upper bearing member 38. The lower member 40 is thus positioned, bonded and secured to the shaft 10. The upper member 42 is fitted into a hole in the edge wall 30b of the hub 30. The lower, inner periphery of the upper member 42 comes into contact with the obverse surface of the outer ring 38a of the upper bearing member 38. The upper member 42 is thus positioned, bonded and secured to the hub 30. The upper and lower members 42 and 40, cooperating with each other, constitute the labyrinth seal means.

The spindle motor shown in FIG. 1 can be assembled by arranging the various components in a predetermined order as described above.

The outside diameters of the large-diameter portion 10e, the medium-diameter portion 10f and the small-diameter portion 10g, and the inside diameters of the stator core 22, the inner ring 16b of the lower bearing member 16 and the inner ring 38b of the upper bearing member 38 are all set so that the clearance of each diameter is not more than several $\mu$m. Therefore, the upper and lower bearing members 38 and 16, and the stator core 22 can be smoothly mated with the shaft 10 without causing scoring.

Second Embodiment

The second embodiment of a spindle motor according to this invention will now be described with reference to FIG. 7. In this embodiment a method of connecting a hub to a yoke is improved.

Figure 7:
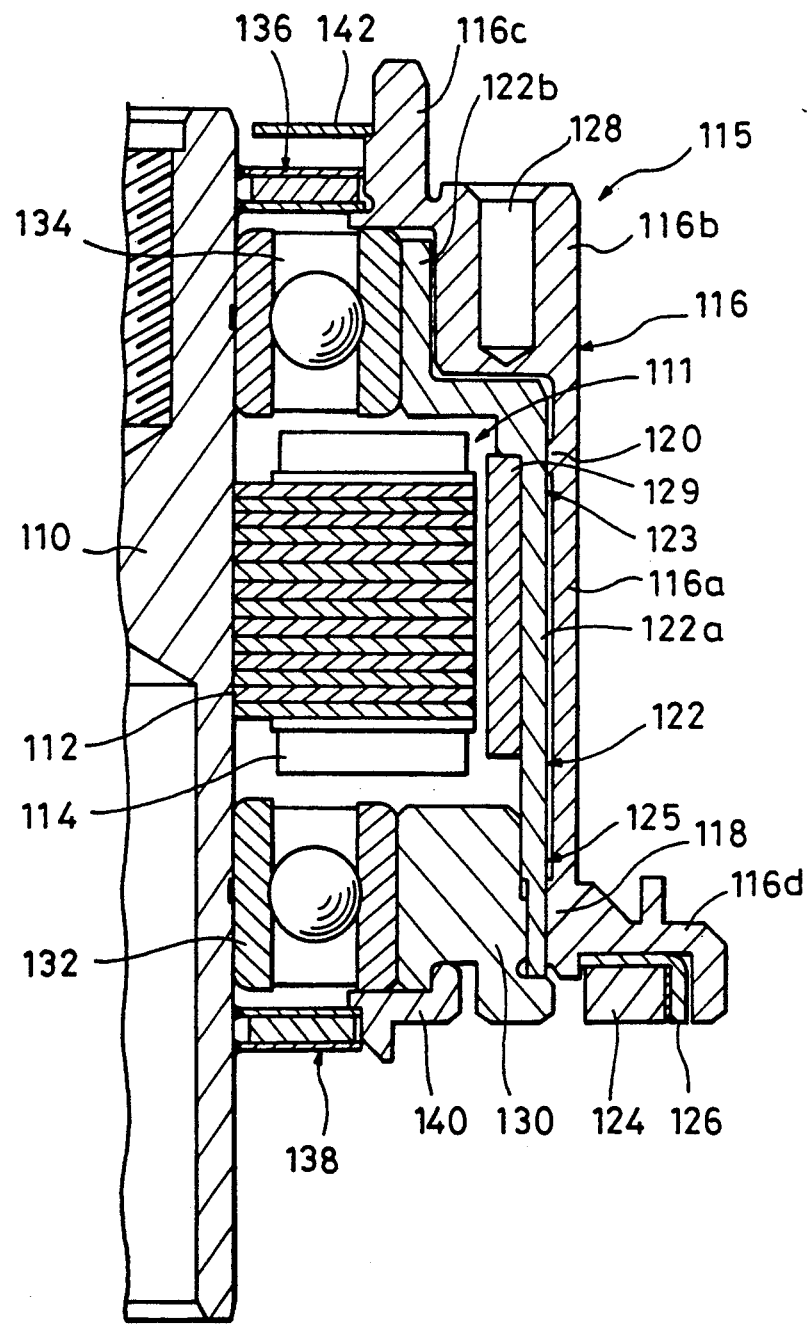
FIG. 7 is a sectional view showing half of a spindle motor according to a second embodiment of this invention.

As shown in FIG. 7, the spindle motor 10 has a shaft 110 which is secured to the upper and lower frames (not shown) of a disk driving device. A stator 111 is disposed substantially at the center of the axial length of the shaft 110. It has a stator core 112 secured to the shaft 110 and a coil 114 wound around the stator core 112.

The shaft 110 rotatably supports a hub assembly unit 115 that has a substantially cylindrical hub 116 made of aluminum. The hub 116 is composed of a hub body 116a, a shoulder 116b, a small-diameter portion 116c and a flange portion 116d. A recording disk, such as a magnetic disk, (not shown) attaches to the hub body 116a. The shoulder 116b forms an upper portion of the hub body 116a shown in FIG. 7. The small-diameter portion 116c is positioned diagonally over the shoulder 116c and close to the shaft 110. The flange portion 116d projects from the lower end of the hub body 116a. The inside diameter of the shoulder 116b of the hub body 116a is reduced so that it is substantially equal to the inside diameter of the small-diameter portion 116c. An upper annular projection 120 and a lower annular projection 118 are respectively formed at the upper and lower peripheries of the hub body 116 where the diameter of the hub body 116 is large.

A substantially cylindrical yoke 122 made of iron is disposed inside the hub 116. The hub 116 is secured through shrink fitting to the lower annular projection 118, which is a first projection, and the upper annular projection 120, which is a second projection. There is a gap between the hub 116 and the yoke 122 except where the upper and lower annular projections 120 and 118 are mated with the yoke 122. The upper and lower annular projections 120 and 118 are used as portions 123 and 125 that fix the hub 116 to the yoke 122. In this embodiment, the fixing portion 125, which is the lower annular projection 118, has a relatively strong force with which it is fitted to the yoke 122 (hereinafter referred to as a fitting force), whereas the fixing portion 123, which is the upper annular projection 120, has a relatively weak fitting force. More specifically, the upper and lower annular projections 120 and 118 extend in substantially the same amount radially and inwardly from the inner periphery of the hub body 116a. However, the upper annular projection 120 has a thickness smaller than the lower annular projection 118 when the thickness is measured in the longitudinal direction of the shaft 110. Therefore, when the hub 116 is connected to the yoke 122, because of the difference of the thicknesses, the fixing portion 125 has a relatively strong fitting force, while the fixing portion 123 has a relatively weak fitting force.

When the hub 116 is secured to the yoke 122 as described above, the following advantageous effects can be obtained. The coefficient of thermal expansion of the aluminum-made hub 116 differs appreciably from that of the iron-made yoke 122 because of the nature of the materials. However, when temperature stays within a certain range, the fixing portions 123 and 125 of the hub 116 remain fixed with respect to the yoke 122. Since there is a small variation in thermal expansion of both components, there is little bending stress caused by heat distortion and both components produce little heat distortion.

On the other hand, when the temperature varies beyond the above range, the yoke 122 and the fixing portion 125 of the hub 116, which has a relatively strong fitting force, remain fixed. Slippage and deviation occur between the yoke 122 and the fixing portion 123, which has a relatively weak fitting force. Because of the slippage, nearly all of the bending stress is avoided, and heat distortion is prevented in both components.

Substantially the entire upper and lower annular projections 120 and 118 on the inner periphery of the hub 116 are contact-bonded through shrink fitting to the outer periphery of the yoke 122. These annular projections 120 and 118 are apart from each other in the longitudinal direction of the shaft 110. It is therefore possible to prevent the hub 116 and the yoke 122 from precession and to coaxially attach both components with accuracy.

In the second embodiment shown in FIG. 7, the upper and lower annular projections 120 and 118 respectively have substantially the same fitting force per unit area. However, the thickness of the lower annular projection 118 is approximately twice that of the upper annular projection 120 when the thickness is measured in the longitudinal direction of the shaft 110, and therefore the projection 118 has a fitting force approximately twice as strong as that of the upper annular projection 120.

A magnet 124 for a frequency generator is secured through another yoke 126 to the reverse surface of the flange or bracket portion 116d. A threaded hole 128 is bored in the shoulder 116b of the hub 116, which hole 128 is used for securing a clamp (not shown) that fixes a recording disk. A cylindrical rotor magnet 129 is bonded and secured to the inner periphery of a large-diameter portion 122a of the yoke 122. A small-diameter portion 122b and an annular member 130 of a hub assembly are rotatably supported by the shaft 110 through upper and lower bearing members 134 and 132, respectively. The hub assembly is mainly composed of the hub 116 and the yoke 122. The annular member 130 is secured to the lower, inner periphery of the yoke 122. The stator 111 faces the rotor magnet 129 in the radial direction of the shaft 110.

Upper magnetic fluid sealing means 136 is disposed above the upper bearing member 134, and likewise, lower magnetic fluid sealing means 138 is disposed below the lower bearing member 132. The upper sealing means 136 is fixed to the inner surface of the small-diameter portion 116c of the hub 116. The lower sealing means 138 is secured to the inner surface of a holder 140 attached to the annular member 130. The upper sealing means 136 seals the gap between the shaft 110 and the small-diameter portion 116c, and similarly, the lower sealing means 138 seals the gap between the shaft 110 and the holder 140. A protective cap 142 is disposed above the upper sealing means 136. The shaft 110, the annular member 130, the upper and lower bearing members 134 and 132, etc. are formed of metallic material of substantially the same coefficient of thermal expansion.

In the above embodiment, a fitting force depends upon the areas (thickness) where the upper and lower annular projections 118 and 120 are mated through shrink fitting to the yoke. However, instead of or together with such an arrangement, the fitting force may also depend upon the amounts the upper and lower annular projections 118 and 120 extend radially. In other words, the fixing portion 125, which is the annular projection 118, extends radially and inwardly a little more than the fixing portion 120, which is the annular projection 120. The fitting force may be changed in accordance with the difference in the amounts the projections 118 and 120 extend radially and inwardly.

In the second embodiment, although the annular projections 118 and 120 are formed on the inner periphery of the hub 116, they may also be formed on the outer periphery of the yoke 122. In such a case, the fitting force may also depend upon the thicknesses of the annular projections and/or upon the amounts the annular projections extend radially and outwardly.

In the second embodiment, the hub 116 and the yoke 122 are supported by the two fixing portions in the axial directions thereof, however, they may also be supported by three or more fixing portions. In this instance, a specific fixing portion of the three or more fixing portions is provided with a relatively strong fitting force, whereas the rest of the fixing portions are provided with a relatively weak fitting force. The required advantageous effect can be obtained with any fixing portion having a strong fitting force. In such a structure, when temperature varies greatly, the hub 116 and the yoke 122 remain fixed with respect to the specific fixing portion. Slippage is produced between the hub 116 and the yoke 122 with respect to the rest of the fixing portions, thus obtaining the same advantageous effects as those described previously.

The embodiments of a spindle motor according to this invention have been described. This invention is not limited to the above embodiments, and various changes and modifications can be made without departing from the scope of this invention.

What is claimed is:

1. A spindle motor comprising:
   a shaft;
   a hub assembly unit rotatable relative to said shaft;
   an upper bearing structure and a lower bearing structure both interposed between said shaft and said hub assembly unit; and
   a stator disposed between said upper bearing structure and said lower bearing structure, wherein said hub assembly unit and said upper bearing structure constitute a unit assembly, said lower bearing structure being formed of a bearing member along with an annular member fitted with an outer ring of said bearing member, said upper bearing structure being formed of a bearing member, said lower bearing structure, said stator and said unit assembly being mounted on the shaft in this order, all from the same direction of said shaft, said annular member of said lower bearing structure supporting one end of said hub assembly unit, and said bearing member of said upper bearing structure supporting the other end of said hub assembly unit.

2. A spindle motor according to claim 1, wherein said shaft has a large-diameter portion with a relatively large diameter, a small-diameter portion with a relatively small diameter, and a medium-diameter portion with a diameter intermediate between said large-diameter portion and said small-diameter portion, said lower bearing structure being attached to said large-diameter portion, said stator being attached to said medium-diameter portion, said upper bearing structure being attached to said small-diameter portion.

3. A spindle motor according to claim 2, wherein a first contact portion is provided at one end of said large-diameter portion and a second contact portion is provided at one end of said medium-diameter portion, whereby said lower bearing structure comes into contact with said first contact portion and is thereby positioned with respect to said large-diameter portion and said stator comes into contact with said second contact portion and is thereby positioned with respect to said medium-diameter portion.

4. A spindle motor according to claim 1, wherein labyrinth seal means is provided outside said upper bearing structure.

5. A spindle motor according to claim 1, wherein said shaft is provided integrally with a bracket which attaches to a frame of a disk driving device.

6. A spindle motor comprising:
a hub with which a recording disk fits;
a yoke disposed inside said hub; and
a rotor magnet disposed inside said yoke;
wherein said hub and said yoke are formed of materials having different coefficients of thermal expansion;
wherein said hub is secured to said yoke through two or more annular fixing portions, a specific fixing portion of the two or more fixing portions having a relatively strong fitting force, the remaining fixing portions having a relatively weak fitting force; and
wherein when temperature varies greatly, said hub and said yoke remain fixed in the specific fixing portion, slippage being produced between said hub and said yoke in the remaining fixing portions.

7. A spindle motor according to claim 6, wherein said hub is secured to said yoke through two annular fixing portions, one fixing portion having a relatively strong fitting force, the other fixing portion having a relatively weak fitting force; and
wherein when temperature varies greatly, said hub and said yoke remain fixed in the one fixing portion, slippage being produced between said hub and said yoke in the other fixing portion.

8. A spindle motor according to claim 7, wherein an area of the one fixing portion where said hub is in contact with said yoke is relatively wide, an area of the other fixing portion where said hub is in contact with said yoke being relatively small.

9. A spindle motor according to claim 7, wherein a first annular projection extending toward said yoke is provided on an inner peripheral surface of said hub in the one fixing portion, a second annular projection extending toward said yoke being provided on the inner peripheral surface of said hub in the other fixing portion, said first annular projection extending a little more toward said yoke than said second annular projection.

10. A spindle motor according to claim 7, wherein a first annular projection extending toward said hub is provided on an outer peripheral surface of said yoke in the one fixing portion, a second annular projection extending toward said yoke being provided on the inner peripheral surface of said hub in the outer fixing portion, said first annular projection extending a little more toward said yoke than said second annular projection.

11. A spindle motor according to claim 6, wherein said hub is formed of aluminum or aluminum alloy, said yoke being formed of iron.

* * * * *